United States Patent
Lin et al.

(10) Patent No.: US 10,324,517 B2
(45) Date of Patent: Jun. 18, 2019

(54) FPGA-BASED SYSTEM POWER ESTIMATION APPARATUS AND METHOD

(71) Applicant: Industrial Technology Research Institute, Hsinchu (TW)

(72) Inventors: Yung-Chieh Lin, Hsinchu County (TW); Shih-Che Lin, Hsinchu (TW); Chao-Hong Chen, Tainan (TW); Liang-Chia Cheng, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 116 days.

(21) Appl. No.: 15/373,466

(22) Filed: Dec. 9, 2016

(65) Prior Publication Data
US 2018/0120916 A1 May 3, 2018

(30) Foreign Application Priority Data
Oct. 27, 2016 (TW) .............................. 105134764 A

(51) Int. Cl.
| G06F 1/32 | (2019.01) |
| G06F 1/324 | (2019.01) |
| G06F 1/3287 | (2019.01) |

(52) U.S. Cl.
CPC ............ G06F 1/324 (2013.01); G06F 1/3287 (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| 6,871,172 B1 | 3/2005 | Sanders |
| 7,370,299 B2 | 5/2008 | Huang et al. |
| 8,217,679 B2 | 7/2012 | Miller |
| 8,495,538 B1 | 7/2013 | Frost et al. |
| 8,510,694 B2 | 8/2013 | Hsieh et al. |
| 2005/0097370 A1* | 5/2005 | Idan ...................... G06F 1/3203 713/300 |
| 2009/0227839 A1* | 9/2009 | Shimada ............ A61B 1/00055 600/118 |
| 2013/0031390 A1 | 1/2013 | Smith, III et al. |
| 2013/0191054 A1 | 7/2013 | Cho et al. |
| 2013/0262895 A1* | 10/2013 | Kayama .................. G06F 1/324 713/322 |

(Continued)

FOREIGN PATENT DOCUMENTS

| CN | 102866291 | 1/2013 |
| CN | 103354977 | 10/2013 |
| TW | 201428520 | 7/2014 |
| TW | I463344 | 12/2014 |
| TW | I528168 | 4/2016 |

OTHER PUBLICATIONS

"Office Action of Taiwan Counterpart Application," dated Jun. 12, 2017, p. 1-5.

(Continued)

Primary Examiner — Zahid Choudhury
(74) Attorney, Agent, or Firm — JCIPRNET

(57) ABSTRACT

A FPGA-based system power estimation apparatus and a method for estimating the power of a target intellectual property (IP) circuit are provided. The system power estimation apparatus includes a FPGA and a power analysis circuit. The FPGA is configured to accommodate the target IP circuit. The power analysis circuit is disposed into the FPGA. The power analysis circuit retrieves an internal operation-state signal of the target IP circuit. The power analysis circuit examines the internal operation-state signal to determine an operation state of the target IP circuit and uses a power model to convert the operation state of the target IP circuit into at least one power value.

32 Claims, 5 Drawing Sheets

(56) References Cited

U.S. PATENT DOCUMENTS

| | | | |
|---|---|---|---|
| 2014/0089697 A1* | 3/2014 | Kim .......................... | G06F 1/26 |
| | | | 713/320 |
| 2015/0169040 A1* | 6/2015 | Kawano .............. | G06F 11/1441 |
| | | | 713/330 |
| 2016/0062437 A1* | 3/2016 | Kim ........................ | G06F 1/324 |
| | | | 713/322 |
| 2016/0098339 A1* | 4/2016 | Masilamani .............. | G06F 1/26 |
| | | | 702/186 |

OTHER PUBLICATIONS

Synopsys, Inc., "System Level Power Modeling Using UPF3.0", the manual of the System Level Power Modeling Using UPF3.0, Product Version L-2016.06, Jun. 2016, pp. 1-54.

Xilinx, Inc., "Xilinx Power Estimator User Guide", the manual of the Xilinx Power Estimator User Guide, Product UG440 (v2013. 2/14.6), Jun. 19, 2013, pp. 1-89.

Synopsys, Inc., "PrimeTime PX User Guide", the manual of the PrimeTime PX User Guide, Product Version L-2016.06, Jun. 2016, pp. 1-191.

Lauro Rizzatti., "A New Approach to Accurate Dynamic Power Estimation of SoC Designs", EE Times, Jun. 1, 2015, pp. 1-2.

Altera Corporation., "PowerPlay Early Power Estimator User Guide", the manual of the PowerPlay Early Power Estimator User Guide, Product UG-01070, Jan. 20, 2015, pp. 1-58.

Synopsys, Inc., "HAPS ProtoCompiler Debugger User Guide", the manual of the ProtoCompiler Debugger User Guide, Sep. 2016, pp. 1-118.

* cited by examiner

FPGA-BASED SYSTEM POWER ESTIMATION APPARATUS AND METHOD

CROSS-REFERENCE TO RELATED APPLICATION

This application claims the priority benefit of Taiwan application serial no. 105134764, filed on Oct. 27, 2016. The entirety of the above-mentioned patent application is hereby incorporated by reference herein and made a part of this specification.

TECHNICAL FIELD

The disclosure relates to a field programmable gate array (FPGA)-based system power estimation apparatus and method.

BACKGROUND

Along with development of electronic products, requirements for "high performance" and "low power consumption" become two major considerations in chip design nowadays. An integrated circuit (IC) design engineer has to build a power model of a chip module so as to conduct system-on-chip (SoC) system power estimation. Generally speaking, SoC system power estimation is completed by using equipment such as a simulator or an emulator.

A simulator is an estimation tool with use of software simulation. Running efficiency/speed of a simulator drops significantly along with size increase of a tested IC. The running efficiency of the simulator generally reaches thousands of cycles per second (K cycles/second). With said efficiency/speed, the simulator is not suitable for large systems (e.g., SoC).

An emulator is an estimation tool with use of hardware acceleration means. Running efficiency of an emulator reaches millions of cycles per second (M cycles/second). With the efficiency/speed, the emulator is suitable for large systems (e.g., SoC). In any case, the price of an emulator is considerably high.

SUMMARY

A field programmable gate array (FPGA)-based system power estimation apparatus and a method are introduced herein by the disclosure, and the FPGA-based system power estimation apparatus and the method are used to improve running efficiency of system power estimation.

An exemplary embodiment of the disclosure provides a FPGA-based system power estimation apparatus configured to estimate power of a target intellectual property (IP) circuit. The system power estimation apparatus includes a FPGA and a power analysis circuit. The FPGA is configured to accommodate the target IP circuit. The power analysis circuit is disposed into the FPGA. The power analysis circuit retrieves an internal operation-state signal of the target IP circuit. The power analysis circuit examines the internal operation-state signal to determine an operation state of the target IP circuit and converts the operation state of the target IP circuit into at least one power value by using a power model.

An exemplary embodiment of the disclosure provides a FPGA-based system power estimation method for estimating power of a target IP circuit. The system power estimation method includes: providing a FPGA to accommodate the target IP circuit, disposing a power estimation circuit into the FPGA, retrieving an internal operation-state signal of the target IP circuit by the power estimation circuit, examining the internal operation-state signal to determine an operation state of the target IP circuit, and converting the operation state of the target IP circuit into at least one power value by using a power model.

In view of the foregoing, according to the FPGA-based system power estimation apparatus and method in exemplary embodiments of the disclosure, the target IP circuit and the power analysis circuit may be disposed into the FPGA. The power analysis circuit examines the internal operation-state signal of the target IP circuit to determine the operation state of the target IP circuit. The power analysis circuit converts the operation state of the target IP circuit into at least one power value by using the power model so as to estimate the system power of the target IP circuit. Comparing to a simulator, the FPGA configured to conduct the system power estimation improves the running efficiency of the system power estimation effectively. Comparing to an emulator, the FPGA conducting the system power estimation reduces costs of system power estimation effectively.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION OF DISCLOSURE EMBODIMENTS

Figure 1:
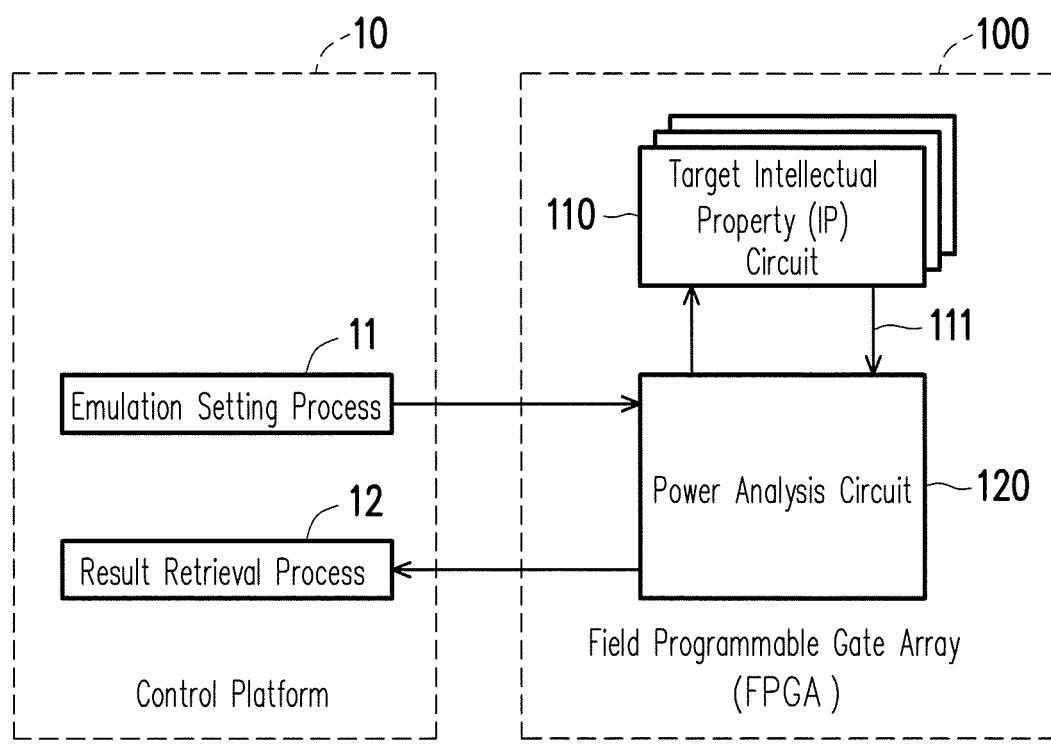
FIG. 1 is a schematic circuit block diagram illustrating a FPGA-based system power estimation apparatus according to an exemplary embodiment.

The term "coupled to (or connected to)" used in the entire disclosure (including claims) refers to any direct or indirect connecting means. For example, if the disclosure describes a first apparatus is coupled to (or connected to) a second apparatus, the description should be explained as the first apparatus that is connected directly to the second apparatus, or the first apparatus, through connecting other apparatus or using certain connecting means, is connected indirectly to the second apparatus. Moreover, elements/components/steps having same reference numerals represent same or similar parts in drawings and embodiments where possible. Elements/components/steps having same reference numerals or same terms are used as cross reference in different embodiments.

FIG. 1 is a schematic block diagram illustrating a circuit of a field programmable gate array (FPGA)-based system power estimation apparatus according an exemplary embodiment. The system power estimation apparatus includes a FPGA 100 and a power analysis circuit 120. The FPGA 100 is configured to accommodate one or a plurality of target intellectual property (IP) circuits, e.g., the target IP circuit 110 as illustrated in FIG. 1. The system power estimation apparatus is configured to estimate power of one or a plurality of IP circuits (e.g., the target IP circuit 110 in FIG. 1). The target IP circuit 110 includes a processor, a memory, a direct memory access (DMA) controller, and/or other IP elements according to design requirements. The processor is a central processing unit (CPU), a digital signal processor (DSP), a micro-controller, or any other processor/controller.

A control platform 10 is coupled to the FPGA 100. Some exemplary embodiments provide that the control platform 10 and the FPGA 100 are disposed on the same printed circuit board (PCB), e.g., on the same verify/debug board. An external host (not shown, e.g., a computer) is configured to perform synthesis, place, route, and/or other operations on a register-transfer level (RTL) netlist, so as to program the target IP circuit 110 and a power analysis circuit 120 into the FPGA 100 through the control platform 10. Other embodiments provide that the control platform 10 is a computer or any other calculator/controller machine, and the FPGA 100 is disposed on a PCB (e.g., a verify board or a debug board), wherein the control platform 10 performs synthesis, place, route, and/or other operations on the RTL netlist, so as to program the target IP circuit 110 and the power analysis circuit 120 into the FPGA 100 through a communication interface.

Figure 2:
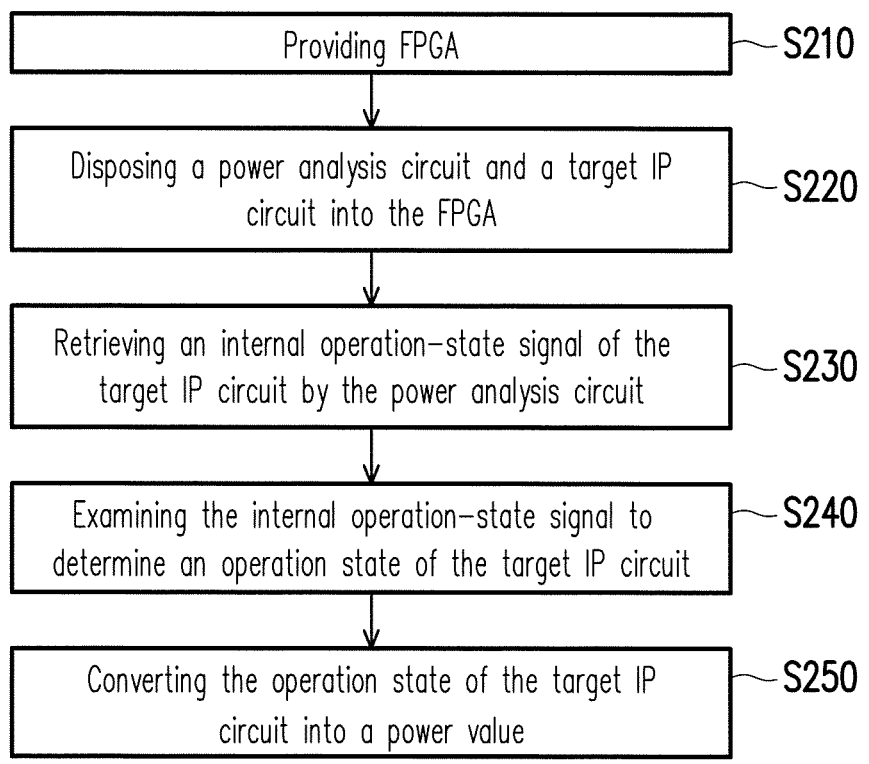
FIG. 2 is a schematic flowchart illustrating a FPGA-based system power estimation method according to an exemplary embodiment.

FIG. 2 is a schematic flowchart illustrating a FPGA-based system power estimation method according to an exemplary embodiment. Referring to FIG. 1 and FIG. 2, the FPGA 100 is provided to the system power estimation apparatus in step S210. In step S220, a target IP circuit 110 and a power analysis circuit 120 are disposed into the FPGA 100, wherein the power analysis circuit 120 does not belong to the target IP circuit 110. A control platform 10 is configured to perform an emulation setting process 11 so as to set emulation parameters of the FPGA 100. In an emulation process of the target IP circuit 110, the power analysis circuit 120 retrieves an internal operation-state signal 111 (step S230) of the target IP circuit 110. For example (but not limited hereto), the power analysis circuit 120 retrieves a state bus signal of a finite state machine (not shown) inside the target IP circuit 110 as the internal operation-state signal 111 of the target IP circuit 110. Since the finite state machine is known to people having ordinary skill in the art, detailed description is omitted. The power analysis circuit 120 monitors the operation state of the target IP circuit 110 without interfering an operation of the target IP circuit 110; therefore, design of the target IP circuit 110 is not required to be changed.

In step S240, the power analysis circuit 120 examines the internal operation-state signal 111 to determine the operation state of the target IP circuit 110. For example (but not limited hereto), if the target IP circuit 110 is a DMA controller, the operation state of the target IP circuit 110 includes an idle state, an active state, and/or other operation states. If the target circuit 110 is a processor, the operation state of the target IP circuit 110 includes a configuration state, the active state, a cache miss state, the idle state, and/or other operation states.

The control platform 10 provides a power model of the target IP circuit 110 to the power analysis circuit 120. In step S250, the power analysis circuit 120 converts the operation state of the target IP circuit 110 into at least one power value by using the power model. The power value includes a static power value, a dynamic power value, or other power information according to design requirements. The power model records the power model of the target IP circuit 110. For example, the power model provides a coefficient (e.g., a dynamic power coefficient or other coefficient values) required by calculation of the at least one value and/or a calculation formula. In another example, the power model records power information (e.g., a static power value, a dynamic power value or other power information) of the target IP circuit 110 under different operation states. A user may enter the power information into the power model according to a specification of the target IP circuit 110, set up the power information of the power model by the user himself, or enter simulated power information into the power model by using a conventional low-level abstract level simulation. The low-level abstract level simulation is a register transfer level (RTL), a gate level, a transistor level, or other low level power simulation, for example.

The power analysis circuit 120 converts the operation state of the target IP circuit 110 into at least one power value (step S250) by using the power model. The power value includes a dynamic power value and/or a static power value. Then, the power analysis circuit 120 records the at least one power value and a corresponding time stamp into a power database for power analysis of the entire target system. The power database is disposed in the FPGA 100 or the control platform 10 according to design requirements.

Some exemplary embodiments provide that the power model includes a lookup table. The lookup table includes a mode field and a dynamic power coefficient field. For example, the power model includes a lookup table as illustrated in TAB. 1.

TABLE 1

| Power Model | |
| --- | --- |
| Mode | Dynamic Power Coefficient |
| Active State | 0.00006683 |
| Idle State | 0.00005995 |

In step S240, the power analysis circuit 120 acquires the operation state of the target IP circuit 110. The power analysis circuit 120 looks up the mode field in the power model (the lookup table as illustrated in TAB. 1) according to the operation state of the target IP circuit 110 for acquiring a corresponding value of a dynamic power coefficient field from the lookup table. Here, the corresponding value of the dynamic power coefficient field is a dynamic power coefficient or a dynamic electric current coefficient. If the corresponding value of the dynamic power coefficient field is the dynamic power coefficient, the power analysis circuit 120 calculates a dynamic power value of the target IP circuit 110 under the current operation state by multiplying the dynamic power coefficient by clock frequency, wherein the clock frequency is the current operation frequency of the target IP circuit 110. If the corresponding value of the dynamic power coefficient field is the dynamic electric current coefficient, the power analysis circuit 120 calculates the dynamic power value of the target IP circuit 110 under current operation state by multiplying the dynamic electric current coefficient, the voltage value, and the clock frequency, wherein the voltage value is the current operation voltage (system voltage) of the target IP circuit 110. The dynamic power value serves as the power value of the target IP circuit 110. Then, the power analysis circuit 120 writes an identification code, the current operation state, the dynamic power value (the power value) and the corresponding time stamp of the target IP circuit 120 into a power database. Alternatively, the power analysis circuit 120 transfers the identification code, the current operation state, the dynamic power value (the power value), and the corresponding time stamp of the target IP circuit 110 to the control platform 10. The control platform 10 conducts a result retrieval process 12 so as to write the identification code, the current operation state, the dynamic power value (the power value), and the corresponding time stamp of the target IP circuit 110 into the power database.

Some exemplary embodiments provide that the power model (the lookup table) includes the mode field and/or a static power coefficient field. For example, the power model includes the lookup table as illustrated in TAB. 2.

TABLE 2

| Power Model | |
|---|---|
| Mode | Static Power Coefficient |
| Active State | 0.00533 |
| Idle State | 0.00532 |

The power analysis circuit 120 looks up the mode field in the power model (e.g., the lookup table in TAB. 2) in the step S250 and retrieves the corresponding value of the static power coefficient field according to the operation state of the target IP circuit 110. Here, the corresponding value of the static power coefficient field is a static power value or a static electric current coefficient. If the corresponding value of the static power coefficient field is the static electric current coefficient, the power analysis circuit 120 calculates the static power value of the target IP circuit 110 under the current operation state by multiplying the static electric current by a voltage value, wherein the voltage value is the current operation voltage (the system voltage) of the target IP circuit 110. The static power value serves as the power value of the target IP circuit 110. Then, the power analysis circuit 120 transfers an identification code, the current operation state, the static power (the power value), and a corresponding time stamp of the target IP circuit 110 to the control platform 10.

Some other embodiments provide that a lookup table of the power model includes a mode field, a dynamic power coefficient field, and a static power coefficient field. For example, the power model includes the lookup table as illustrated in TAB. 3.

TABLE 3

| Power Model | | |
|---|---|---|
| Mode | Dynamic Power Coefficient | Static Power Coefficient |
| Active State | 0.00006683 | 0.00533 |
| Idle State | 0.00005995 | 0.00532 |

The power analysis circuit 120 looks up the mode field in the power model (e.g., the lookup table in TAB. 3) in the step S250 and retrieves the corresponding value of the dynamic power coefficient field and the corresponding value of the static power coefficient field according to the operation state of the target IP circuit 110. Here, the corresponding value of the dynamic power coefficient field is a dynamic power coefficient or a dynamic electric current coefficient. If the corresponding value of the dynamic power coefficient field is the dynamic power coefficient, the power analysis circuit 120 calculates the dynamic power value of the target IP circuit 110 under the current operation state by multiplying the dynamic power coefficient by a clock frequency, wherein the clock frequency is the current operation frequency of the target IP circuit 110. If the corresponding value of the dynamic power coefficient field is the dynamic electric current coefficient, the power analysis circuit 120 calculates the dynamic power value of the target IP circuit 110 under the current operation state by multiplying the dynamic electric current coefficient, the voltage value, and the clock frequency, wherein the voltage value is a current operation voltage (a system voltage) of the target IP circuit 110. The corresponding value of the static power coefficient field is a static power value or a static electric current coefficient. If the value of the static power coefficient field is the static electric current coefficient, the power analysis circuit 120 calculates the static power value of the target IP circuit 110 under the current operation state by multiplying the static electric current coefficient by the voltage value, wherein the voltage value is the current operation voltage (the system voltage) of the target IP circuit 110. The dynamic power value and the static power value serve as the power values of the target IP circuit 110. Then, the power analysis circuit 120 transfers an identification code, the current operation state, the static power, the dynamic power, and a corresponding time stamp of the target IP circuit 110 to the control platform 10.

Some exemplary embodiments provide that if the target IP circuit 110 has a dynamic power management (DPM) function, the power analysis circuit 120 receives an extra power factor from a DPM controller, a power management unit (PMU), and/or other control circuits of the target IP circuit 110. For example, the power factor is an operation voltage, a clock frequency, a DPM state, and/or other operation conditions of the target IP circuit 110. The DPM state includes a high voltage mode, a low voltage mode, and/or a hibernation mode, etc. The power analysis circuit 120 uses the power factor and the power model to convert the operation state of the target IP circuit 110 to a power value and records the power value and a corresponding time stamp into the power database. The power analysis circuit 120 dynamically and correctly responds the powers under different states based on extra power factors.

For example, a lookup table of the power model at least has a power factor field, a mode field, and a power coefficient field, wherein the power coefficient field includes a dynamic power coefficient field and/or a static power coefficient field. For example, the lookup table in TAB. 4 includes an operation voltage field (namely the power factor field), the mode field, the dynamic power coefficient field, and the static power coefficient field.

TABLE 4

| Power Model | | | |
|---|---|---|---|
| Operation Voltage | Mode | Dynamic Power Coefficient | Static Power Coefficient |
| 0.8 V | Configuration State | 0.0001175 | 0.0181 |
| 0.8 V | Active State | 0.0001313 | 0.0271 |

TABLE 4-continued

Power Model

| Operation Voltage | Mode | Dynamic Power Coefficient | Static Power Coefficient |
|---|---|---|---|
| 0.8 V | Cache Miss State | 0.0000875 | 0.0269 |
| 0.8 V | Idle State | 0.0001168 | 0.0175 |
| 0.9 V | Configuration State | . . . | . . . |
| . . . | . . . | . . . | . . . |

In the step S240, the power analysis circuit 120 acquires the operation state and the power factor (an operation voltage here) of the target IP circuit 110. The power analysis circuit 120 looks up the operation voltage field (namely the power factor field) and the mode field of the power model (as illustrated in TAB. 4) according to the operation state and the power factor and acquires a corresponding value of a dynamic power coefficient field and/or a corresponding value of a static power coefficient field. Since the descriptions of the dynamic power coefficient field and the static power coefficient field illustrated in TAB. 4 may be deduced from the descriptions of TAB. 1 to TAB. 3, no further explanation is provided hereinafter. If the corresponding value of the dynamic power coefficient field is a dynamic power coefficient, the power analysis circuit 120 calculates the dynamic power value of the target IP circuit 110 under the current operation state by multiplying the dynamic power coefficient by the clock frequency, wherein the clock frequency is the current operation frequency (the power factor) of the target IP circuit 110. If the corresponding value of the dynamic power coefficient field is a dynamic electric current coefficient, the power analysis circuit 120 calculates the dynamic power value of the target IP circuit 110 under the current operation state by multiplying the dynamic electric current coefficient, the voltage value, and the clock frequency, wherein the voltage value is the current operation voltage (the system voltage, namely the power factor) of the target IP circuit 110. The corresponding value of the static power coefficient field is a static power value or a static electric current coefficient. If the corresponding value of the static power coefficient field is the static electric current coefficient, the power analysis circuit 120 calculates the static power value of the target IP circuit 110 under the current operation state by multiplying the static electric current coefficient by the voltage value, wherein the voltage value is the current operation voltage (the system voltage, namely the power factor) of the target IP circuit 110. The dynamic power value and/or the static power value serve/serves as the power value of the target IP voltage 110. Then, the power analysis circuit 120 transfers an identification code, the current operation state, the static power, the dynamic power, and a corresponding time stamp of the target IP circuit 110 to the control platform 10.

The control platform 10 conducts a result retrieval process 12 so as to write the identification code, the current operation state, the dynamic power value (the power value), and the corresponding time stamp of the target IP circuit 110 into the power database. For example (but not limited hereto), the power database includes a mode field, a time stamp field, and a power value field. The power value field includes a dynamic power field and/or a static power field. Exemplary contents of the power database of the target IP circuit 110 are illustrated in TAB. 5, wherein the identification code "1" indicates one of a plurality of identifiers of the target IP circuits 110.

TABLE 5

Power Database

| Identification Code | Time Stamp | Dynamic Power | Static Power | Mode |
|---|---|---|---|---|
| 1 | 0 | 0 | 0.00082 | Idle State |
| 1 | 0 | 0.053880 | 0.003786 | Write State |
| 1 | 570118 ns | 0.029722 | 0.001438 | Read State |
| 1 | 670251 ns | 0.037472 | 0.001438 | Read State |
| . . . | . . . | . . . | . . . | . . . |

Figure 3:
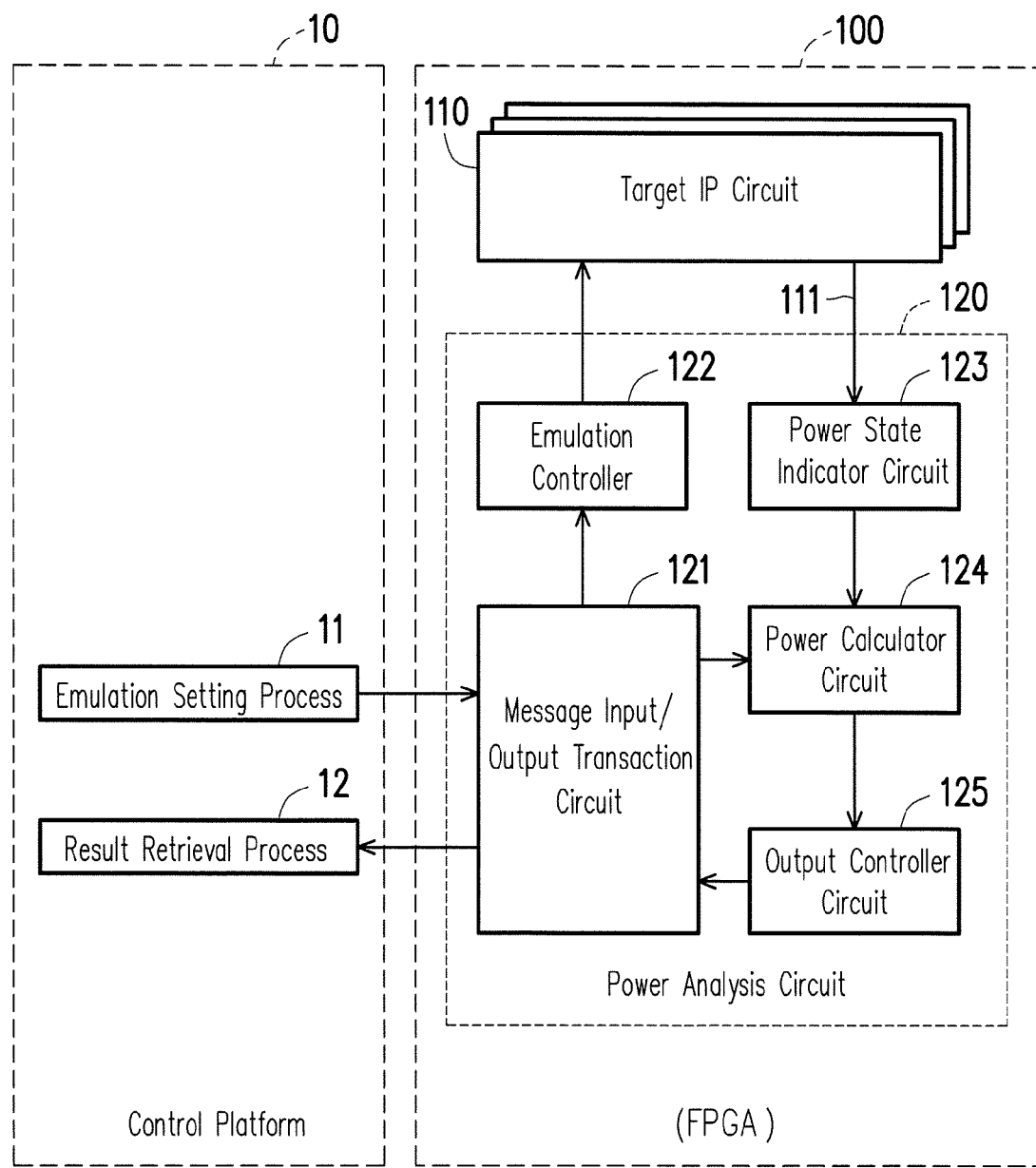
FIG. 3 is a schematic circuit block diagram illustrating the power analysis circuit depicted in FIG. 1 according to an exemplary embodiment.

FIG. 3 is a schematic circuit block diagram illustrating the power analysis circuit 120 illustrated in FIG. 1 according to an exemplary embodiment. An exemplary embodiment as illustrated in FIG. 3 provides that the power analysis circuit 120 includes a message input/output transaction circuit 121, an emulation controller 122, a power state indicator circuit 123, a power calculator circuit 124, and an output controller circuit 125. The power analysis circuit 120 acquires a power model of a target IP circuit 110 from a control platform 10 through the message input/output transaction circuit and transfer a power value of the target IP circuit 110 to the control platform 10 through the message input/output transaction circuit 121.

The emulation controller 122 provides a time stamp and running, stop, and emulation mechanisms. For example, when the control platform 10 configures the power model of the target IP circuit 110 to the power calculator circuit 124, the emulation operation is in a stop state. When the power model is completely configured, the emulation operation begins to run. Insufficient bandwidth during data write-back causes the output message FIFO buffer inside the output controller circuit 125 to overflow; at this moment, the emulation controller 122 stops the emulation operation and waits for buffer space so as to continue to run the emulation operation.

The power state indicator circuit 123 retrieves an internal operation-state signal of the target IP circuit 110. The power state indicator circuit 123 examines the internal operation-state signal to determine an operation state of the target IP circuit 110. The power calculator circuit 124 is coupled to the power state indicator circuit 123 to receive the operation state of the target IP circuit 110. The power calculator circuit 124 converts the operation state of the target IP circuit 110 to the at least one power value (e.g., a static power value and/or a dynamic power value) by using a power model. For example (but not limited hereto), the power calculator circuit 124 looks up a lookup table of the power model according to the operation state provided by the power state indicator circuit 123 for acquiring a power value corresponding to the operation state of the target IP circuit 110.

Some embodiment provides that the operation state provided by the power state indicator circuit 123 includes a system clock frequency value of the target IP circuit 110. The power calculator circuit 124 looks up a lookup table of a power model according to the system clock frequency value for acquiring a plurality of adjacent frequency values corresponding to the system clock frequency value. The power calculator circuit 124 conducts an interpolation calculation (or an extrapolation calculation) by using the adjacent frequency values for acquiring the power value of the target IP circuit 110.

Figure 4:
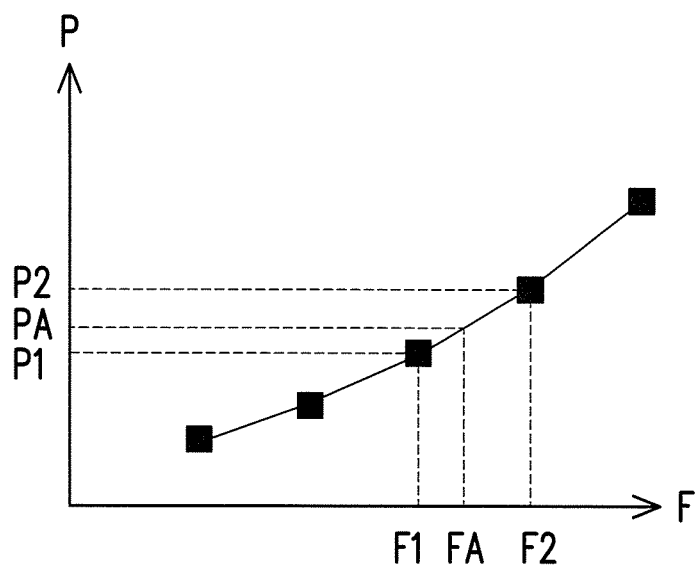
FIG. 4 is schematic curve diagram illustrating a frequency power of a power model according to an exemplary embodiment.

For example, FIG. 4 is a schematic curve diagram illustrating a frequency power of a power model according to an exemplary embodiment. In FIG. 4, the horizontal axis represents a clock frequency value F of a target IP circuit 110, while the vertical axis represents a power value P of the target IP circuit 110. If a system clock frequency value of the target IP circuit 110 provided by the power state indicator circuit 123 is FA, the power calculator circuit 124 looks up a lookup table of a power model according to the system clock frequency value FA and finds two adjacent frequency values F1 and F2 adjacent to the system clock frequency value FA, as illustrated in FIG. 4. Candidate power values corresponding to the two adjacent frequency values F1 and F2 are P1 and P2, respectively. The power calculator circuit 124 conducts an interpolation calculation by using the two adjacent frequency values F1 and F2 and the two candidate power values P1 and P2. For example (but not limited hereto), the power calculator circuit 124 performs a calculation according to an equation, $PA=P1*(FA-F1)/(F2-F1)$, for acquiring the power value PA of the target IP circuit 110. Under certain circumstances, when the system clock frequency value FA of the target IP circuit 110 falls outside the border of the power model, the power calculator circuit 124 conducts an extrapolation calculation by using these adjacent frequency values so as to acquire the power value of the target IP circuit 110.

Some exemplary embodiments provide that the operation state provided by the power state indicator circuit 123 further includes a system clock frequency value and a system voltage value of the target IP circuit 110, and the power model includes a plurality of lookup tables. The power calculator circuit 124 chooses a candidate lookup table from the lookup tables according to the system voltage value of the target IP circuit 110, wherein the candidate lookup table corresponds to a candidate reference voltage value. The power calculator circuit 124 looks up the candidate lookup table according to the system clock frequency value of the target IP circuit 110 for acquiring a candidate power value corresponding to the system clock frequency value of the target IP circuit 110. The power calculator circuit 124 calculates the power value of the target IP circuit 110 by using the system voltage value, the candidate reference voltage value, and the candidate power value.

Figure 5:
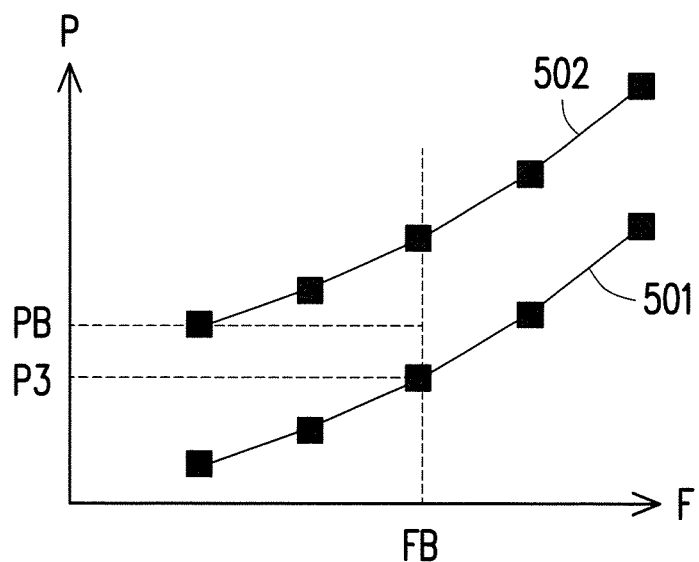
FIG. 5 is a schematic curve diagram illustrating a frequency power of a power model according to another exemplary embodiment.

For example, FIG. 5 is schematic curve diagram illustrating a frequency power of a power model according to an exemplary embodiment. In FIG. 5, the horizontal axis represents a clock frequency value F of a target IP circuit 110, while the vertical axis represents a power value P of the target IP circuit 110. A system clock frequency value of a target IP circuit 110 provided by a power state indicator circuit 123 is FB, and a system voltage value of the target IP circuit 110 is Vt. A power calculator circuit 124 chooses a candidate lookup table from a plurality lookup tables (e.g., the candidate lookup tables 501 and 502 illustrated in FIG. 5) according to the system voltage value Vt of the target IP circuit 110, wherein the candidate lookup table 501 corresponds to a candidate reference voltage value Vr1, while the candidate lookup table 502 corresponds to another candidate reference voltage value Vr2. It is supposed that the system voltage value Vt of the target IP circuit 110 is greater than the candidate reference voltage value Vr1 and smaller than the candidate reference voltage value Vr2. Since the system voltage value Vt is closer to the candidate reference voltage value Vr1 than to the candidate reference voltage value Vr2, the power calculator circuit 124 chooses the lookup table 501 according to the system voltage value Vt of the target IP circuit 110. The power calculator circuit 124 looks up the candidate lookup table 501 according to the system clock frequency value FB of the target IP circuit 110 for acquiring a candidate power value P3 corresponding to the system clock frequency value FB of the target IP circuit 110. The power calculator circuit 124 calculates the power value PB of the target IP circuit 110 by using the system voltage value Vt, the candidate reference voltage value Vr1, and the candidate power value P3. For example (but not limited hereto), the power calculator circuit 124 performs a calculation according to an equation $PB=P3*(Vt/Vr1)^2=P3*(Vt/Vr1)*(Vt/Vr1)$ so as to acquire the power value PB of the target IP circuit 110.

Figure 6:
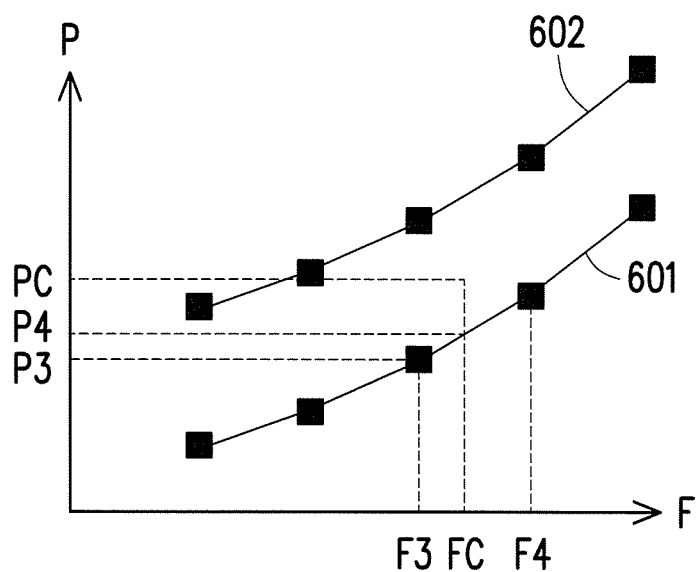
FIG. 6 is a schematic curve diagram illustrating a frequency power of a power model according to still another exemplary embodiment.

FIG. 6 is a schematic curve diagram illustrating a frequency power of a power model according to an exemplary embodiment. In FIG. 6, the horizontal axis represents a clock frequency value F of a target IP circuit 110, while the vertical axis represents a power value P of the target IP circuit 110. It is assumed that a system clock frequency value of the target IP circuit 110 provided by a power state indicator circuit 123 is FC, and a system voltage value of the target IP circuit 110 is Vt. A power calculator circuit 124 chooses a candidate lookup table from a plurality lookup tables (e.g., the candidate lookup tables 601 and 602 illustrated in FIG. 6) according to the system voltage value Vt of the target IP circuit 110, wherein the candidate lookup table 601 corresponds to a candidate reference voltage value Vr1, while the candidate lookup table 602 corresponds to another candidate reference voltage value Vr2. It is supposed that the system voltage value Vt of the target IP circuit 110 is greater than the candidate reference voltage value Vr1 and smaller than the candidate reference voltage value Vr2. Since the system voltage value Vt is closer to the candidate reference voltage value Vr1 than to the candidate reference voltage value Vr2, the power calculator circuit 124 chooses the lookup table 601 according to the system voltage value Vt of the target IP circuit 110.

The power calculator circuit 124 looks up the lookup table 601 according to the system clock frequency value FC of the target IP circuit 110 and finds two adjacent frequency values F3 and F4 adjacent to the system clock frequency value FC, as illustrated in FIG. 6. A candidate power value corresponding to the adjacent frequency value F3 is P3. The power calculator circuit 124 conducts an interpolation calculation by using the two adjacent frequency values F3 and F4 and the candidate power value P3. For example (but not limited hereto), the power calculator circuit 124 performs a calculation according to an equation $P4=P3*(FC-F3)/(F4-F3)$ so as to acquire a reference power value P4 of the target IP circuit 110. The power calculator circuit 124 calculates the power value PC of the target IP circuit 110 by using the system voltage value Vt, the candidate reference voltage value Vr1, and the reference power value P4. For example (but not limited hereto), the power calculator circuit 124 performs a calculation according to an equation $PC=P4*(Vt/Vr1)^2=P4*(Vt/Vr1)*(Vt/Vr1)$ so as to acquire the power value PC of the target IP circuit 110.

Referring to FIG. 3, an output controller circuit 125 is coupled to the power calculator circuit 124 to receive the power value of the target IP circuit 110. The output controller circuit 125 temporarily stores the power value and wraps the power value into an output message. The message input/output transaction circuit 121 is coupled to the output controller circuit 125 to receive the output message. The message input/output transaction circuit 121 transfers the output message to the control platform 10 outside the FPGA 100.

It is worth noting that under different circumstances, the control platform 10, the emulation setting process 11, the result retrieval process 12, the target IP circuit 110, the power analysis circuit 120, the message input/output transaction circuit 121, the emulation controller 122, the power state indicator circuit 123, the power calculator circuit 124, and/or the output controller circuit 125 may be implemented in form of software, firmware, or hardware by using general programming languages (e.g., C or C++), hardware description languages (e.g., Verilog HDL or VHDL), or other appropriate programming languages. The programming languages or hardware description languages for performing relevant functions are run and deployed into any known computer-accessible media, such as magnetic tapes, semiconductor memories, magnetic disks, or compact disks (e.g., CD-ROM or DVD-ROM), or the programming languages or hardware description languages are delivered through the Internet, wired communication, wireless communication, or other communication media. The programming languages or hardware description languages are stored in the computer-accessible media, such that the programming codes of the programming languages or hardware description languages may be accessed or run by computer processors. Moreover, the apparatus and method as provided in the disclosure are implemented through using hardware and software combinations.

Overall, the exemplary embodiments of the disclosure provide that the target IP circuit 110 and the power analysis circuit 120 are disposed into the same FPGA according to the FPGA-based system power estimation apparatus and method. The power analysis circuit 120 examines the internal operation-state signal of the target IP circuit 110 so as to determine the operation state of the target IP circuit 110. The power analysis circuit 120 converts the operation state of the target IP circuit 110 into at least one power value by using the power model so as to estimate the system power of the target IP circuit 110. Comparing to a simulator, the FPGA configured to conduct the system power estimation improves the running efficiency of the system power estimation effectively. Comparing to an emulator, the FPGA configured to conduct the system power estimation reduces costs of the system power estimation effectively.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A field programmable gate array (FPGA)-based system power estimation apparatus configured to estimate power of a target intellectual property (IP) circuit, the FPGA-based system power estimation apparatus comprising:
   a FPGA, configured to accommodate the target IP circuit, and
   a power analysis circuit, disposed into the FPGA and configured to retrieve an internal operation-state signal of the target IP circuit, examine the internal operation-state signal to determine an operation state of the target IP circuit, and convert the operation state of the target IP circuit into at least one power value by using a power model,
   wherein conversion to power value by the power analysis circuit comprises: the power analysis circuit multiplying a clock frequency of the target IP circuit by a corresponding value of a dynamic power coefficient field or an operation voltage of the target IP circuit for acquiring a dynamic power value of the target IP circuit as the at least one power value.

2. The FPGA-based system power estimation apparatus as claimed in claim 1, wherein the power model provides a coefficient or a calculation formula required by calculating the at least one power value.

3. The FPGA-based system power estimation apparatus as claimed in claim 1, wherein the power model comprises a lookup table, and the lookup table comprises a mode field and the dynamic power coefficient field, the power analysis circuit looking up the mode field of the lookup table based on the operation state of the target IP circuit and acquiring the corresponding value of the dynamic power coefficient field, and the power analysis circuit multiplying the clock frequency or the operation voltage of the target IP circuit by the corresponding value of the dynamic power coefficient field for acquiring the dynamic power value of the target IP circuit as the at least one power value.

4. The FPGA-based system power estimation apparatus as claimed in claim 1, wherein the power model comprises a lookup table, and the lookup table comprises a mode field and a static power coefficient field, the power analysis circuit looking up the mode field of the lookup table according to the operation state of the target IP circuit and acquiring a corresponding value of the static power coefficient field, and the power analysis circuit taking the corresponding value of the static power coefficient field as the at least one power value or multiplying the operation voltage of the target IP circuit by the corresponding value of the static power coefficient field as the at least one power value.

5. The FPGA-based system power estimation apparatus as claimed in claim 1, wherein the power model comprises a lookup table, and the lookup table comprises a mode field, the dynamic power coefficient field, and a static power coefficient field, the power analysis circuit looking up the mode field of the lookup table according to the operation state of the target IP circuit for acquiring the corresponding value of the dynamic power coefficient field and a corresponding value of the static power coefficient field, the power analysis circuit multiplying the clock frequency or the operation voltage of the target IP circuit by the corresponding value of the dynamic power coefficient field for acquiring the dynamic power value of the target IP circuit, and the power analysis circuit taking the corresponding value of the static power coefficient field and the dynamic power value as the at least one power value.

6. The FPGA-based system power estimation apparatus as claimed in claim 1, wherein the power model comprises a lookup table, and the lookup table comprises a mode field, the dynamic power coefficient field, and a static power coefficient field, the power analysis circuit looking up the mode field of the lookup table according to the operation state of the target IP circuit for acquiring the corresponding value of the dynamic power coefficient field and a corresponding value of the static power coefficient field, the power analysis circuit multiplying the clock frequency or the operation voltage of the target IP circuit by the corresponding value of the dynamic power coefficient field for acquiring the dynamic power value of the target IP circuit, the power analysis circuit multiplying the operation voltage of the target IP circuit by the corresponding value of the static power coefficient field for acquiring a static power value of the target IP circuit, and the power analysis circuit taking the static power value and the dynamic power value as the at least one power value.

7. The FPGA-based system power estimation apparatus as claimed in claim 1, wherein the power model comprises a lookup table, and the lookup table comprises a power factor field, a mode field, and the dynamic power coefficient field, the power analysis circuit looking up the power factor field of the lookup table according a power factor of dynamic power management and looking up the mode field of the lookup table according to the operation state of the target IP circuit for acquiring the corresponding value of the dynamic power coefficient field, and the power analysis circuit multiplying the power factor by the corresponding value of the dynamic power coefficient field for acquiring the the dynamic power value of the target IP circuit as the at least one power value.

8. The FPGA-based system power estimation apparatus as claimed in claim 1, wherein the power model comprises a lookup table, and the lookup table comprises a power factor field, a mode field, and a static power coefficient field, the power analysis circuit looking up the power factor field of the lookup table according to a power factor of dynamic power management and looking up the mode field of the lookup table according to the operation state of the target IP circuit for acquiring a corresponding value of the static power coefficient field, and the power analysis circuit taking the corresponding value of the static power coefficient field as the at least one power value or multiplying the power factor by the corresponding value of the static power coefficient field as the at least one power value.

9. The FPGA-based system power estimation apparatus as claimed in claim 1, wherein the power model comprises a lookup table, and the lookup table comprises a power factor field, a mode field, the dynamic power coefficient field, and a static power coefficient field, the power analysis circuit looking up the power factor field of the lookup table according to a power factor of dynamic power management and looking up the mode field of the lookup table according to the operation state of the target IP circuit for acquiring the corresponding value of the dynamic power coefficient field and a corresponding value of the static power coefficient field, the power analysis circuit multiplying the power factor by the corresponding value of the dynamic power coefficient field for acquiring the dynamic power value of the target IP circuit, and the power analysis circuit taking the corresponding value of the static power coefficient field and the dynamic power value as the at least one power value.

10. The FPGA-based system power estimation apparatus as claimed in claim 1, wherein the power model comprises a lookup table, and the lookup table comprises a power factor field, a mode field, the dynamic power coefficient field, and a static power coefficient field, the power analysis circuit looking up the power factor field of the lookup table according to a power factor of dynamic power management and looking up the mode field of the lookup table according to the operation state of the target IP circuit for acquiring the corresponding value of the dynamic power coefficient field and a corresponding value of the static power coefficient field, the power analysis circuit multiplying the power factor by the corresponding value of the dynamic power coefficient field for acquiring the dynamic power value of the target IP circuit, the power analysis circuit multiplying the power factor by the corresponding value of the static power coefficient field for acquiring a static power value of the target IP circuit, and the power analysis circuit taking the static power value and the dynamic power value as the at least one power value.

11. The FPGA-based system power estimation apparatus as claimed in claim 1, wherein the power analysis circuit obtains the power model from a control platform through a message input/output transaction circuit.

12. The FPGA-based system power estimation apparatus as claimed in claim 1, wherein the power analysis circuit transfers the at least one power value to a control platform through a message input/output transaction circuit.

13. The FPGA-based system power estimation apparatus as claimed in claim 1, wherein the power analysis circuit comprises:
a power state indicator circuit for retrieving the internal operation-state signal of the target IP circuit and checking the internal operation-state signal to determine the operation state of the target IP circuit; and
a power calculator circuit, coupled to the power state indicator circuit for receiving the operation state, and configured to use the power model to convert the operation state of the target IP circuit into the at least one power value.

14. The FPGA-based system power estimation apparatus as claimed in claim 13, wherein the power analysis circuit further comprises:
an output controller circuit, coupled to the power calculator circuit for receiving the at least one power value, and configured to wrap the at least one power value into an output message; and
a message input/output transaction circuit, coupled to the output controller circuit for receiving the output message, and configured to transfer the output message to a controller platform outside the FPGA.

15. The FPGA-based system power estimation apparatus as claimed in claim 13, wherein the power calculator circuit looks up a lookup table of the power model according to the operation state provided by the power state indicator circuit for acquiring the at least one power value corresponding to the operation state.

16. The FPGA-based system power estimation apparatus as claimed in claim 13, wherein the operation state provided by the power state indicator circuit comprises a system clock frequency value of the target IP circuit, the power calculator circuit looks up a lookup table of the power model according to the system clock frequency value for acquiring a plurality of adjacent frequency values corresponding to the system clock frequency value, and the power calculator circuit uses the adjacent frequency values to conduct an interpolation calculation or an extrapolation calculation to acquire the at least one power value.

17. The FPGA-based system power estimation apparatus as claimed in claim 13, wherein the operation state provided by the power state indicator comprises a system clock frequency value and a system voltage value of the target IP circuit, the power model comprises a plurality of lookup tables, the power calculator circuit chooses a candidate lookup table from the lookup tables according to the system voltage value, the candidate lookup tables corresponds to a candidate reference voltage value, the power calculator circuit looks up the candidate lookup table according to the system clock frequency value for acquiring at least one candidate power value corresponding to the system clock frequency value, and the power calculator circuit calculate the at least one power value by using the system voltage value, the candidate reference voltage value, and the at least one candidate power value.

18. A field programmable gate array (FPGA)-based system power estimation method for estimating power of a target intellectual property (IP) circuit, the FPGA-based system power estimation method comprising:
providing a FPGA configured to accommodate the target IP circuit;
disposing a power analysis circuit into the FPGA;
retrieving an internal operation-state signal of the target IP circuit by the power analysis circuit;

examining the internal operation-state signal to determine an operation state of the target IP circuit; and
converting the operation state of the target IP circuit into at least one power value by using a power model,
wherein conversion to power value by the power analysis circuit comprises: the power analysis circuit multiplying a clock frequency of the target IP circuit by a corresponding value of a dynamic power coefficient field or an operation voltage of the target IP circuit for acquiring a dynamic power value of the target IP circuit as the at least one power value.

19. The FPGA-based system power estimation method as claimed in claim 18, wherein the power model provides a coefficient or a calculation formula required by the at least one power value.

20. The FPGA-based system power estimation method as claimed in claim 18, wherein the power model comprises a lookup table, the lookup table comprises a mode field and the dynamic power coefficient field, and the step of converting the operation state of the target IP circuit into the at least one power value comprises:
looking up the mode field of the lookup table by the power analysis circuit according to the operation state of the target IP circuit for acquiring the corresponding value of the dynamic power coefficient field; and
multiplying the clock frequency or the operation voltage of the target IP circuit by the corresponding value of the dynamic power coefficient field by the power analysis circuit for acquiring the dynamic power value of the target IP circuit as the at least one power value.

21. The FPGA-based system power estimation method as claimed in claim 18, wherein the power model comprises a lookup table, and the lookup table comprises a mode field and a static power coefficient field, the step of converting the operation state of the target IP circuit into the at least one power value comprising:
looking up the mode field of the lookup table by the power analysis circuit according to the operation state of the target IP circuit for acquiring a corresponding value of the static power coefficient field; and
taking the corresponding value of the static power coefficient field as the at least one power value by the power analysis circuit or multiplying the operation voltage of the target IP circuit by the corresponding value of the static power coefficient field as the at least one power value by the power analysis circuit.

22. The FPGA-based system power estimation method as claimed in claim 18, wherein the power model comprises a lookup table, and the lookup table comprises a mode field, the dynamic power coefficient field, and a static power coefficient field, the step of converting the operation state of the target IP circuit into the at least one power value comprising:
looking up the mode field of the lookup table according to the operation state of the target IP circuit by the power analysis circuit for acquiring the corresponding value of the dynamic power coefficient field and a corresponding value of the static power efficient field;
multiplying the clock frequency or the operation voltage of the target IP circuit by the corresponding value of the dynamic power coefficient field by the power analysis circuit for acquiring the dynamic power value of the target IP circuit; and
taking the corresponding value of the static power coefficient field and the dynamic power value as the at least one power value by the power analysis circuit.

23. The FPGA-based system power estimation method as claimed in claim 18, wherein the power model comprises a lookup table, and the lookup table comprises a mode field, the dynamic power coefficient field, and a static power coefficient field, the step of converting the operation state of the target IP circuit into the at least one power value comprising:
looking up the mode field of the lookup table according to the operation state of the target IP circuit by the power analysis circuit for acquiring the corresponding value of the dynamic power coefficient field and a corresponding value of the static power efficient field;
multiplying the clock frequency or the operation voltage of the target IP circuit by the corresponding value of the dynamic power coefficient field by the power analysis circuit for acquiring the dynamic power value of the target IP circuit;
multiplying the operation voltage of the target IP circuit by the corresponding value of the static power coefficient field by the power analysis circuit for acquiring a static power value of the target IP circuit; and
taking the static power value and the dynamic power value as the at least one power value.

24. The FPGA-based system power estimation method as claimed in claim 18, wherein the power model comprises a lookup table, and the lookup table comprises a power factor field, a mode field, and the dynamic power coefficient field, the step of converting the operation state of the target IP circuit into the at least one power value comprising:
looking up the power factor field of the lookup table according a power factor of dynamic power management by the power analysis circuit and looking up the mode field of the lookup table according to the operation state of the target IP circuit by the power analysis circuit for acquiring the corresponding value of the dynamic power coefficient field; and
multiplying the power factor by the corresponding value of the dynamic power coefficient field by the power analysis circuit for acquiring the dynamic power value of the target IP circuit as the at least one power value.

25. The FPGA-based system power estimation method as claimed in claim 18, wherein the power model comprises a lookup table, and the lookup table comprises a power factor field, a mode field, and a static power coefficient field, the step of converting the operation state of the target IP circuit into the at least one power value comprising:
looking up the power factor field of the lookup table according to a power factor of dynamic power management by the power analysis circuit and looking up the mode field of the lookup table according to the operation state of the target IP circuit by the power analysis circuit for acquiring a corresponding value of the static power coefficient field; and
taking the corresponding value of the static power coefficient field as the at least one power value, or multiplying the power factor by the corresponding value of the static power coefficient field as the at least one power value.

26. The FPGA-based system power estimation method as claimed in claim 18, wherein the power model comprises a lookup table, and the lookup table comprises a power factor field, a mode field, the dynamic power coefficient field, and a static power coefficient field, the step of converting the operation state of the target IP circuit into the at least one power value comprising:
looking up the power factor field of the lookup table according to a power factor of dynamic power management by the power analysis circuit and looking up the mode field of the lookup table according to the operation state of the target IP circuit for acquiring the corresponding value of the dynamic power coefficient field and a corresponding value of the static power coefficient field;

multiplying the power factor by the corresponding value of the dynamic power coefficient field by the power analysis circuit for acquiring the dynamic power value of the target IP circuit; and taking the corresponding value of the static power coefficient field and the dynamic power value as the at least one power value.

27. The FPGA-based system power estimation method as claimed in claim 18, wherein the power model comprises a lookup table, and the lookup table comprises a power factor field, a mode field, the dynamic power coefficient field, and a static power coefficient field, the step of converting the operation state of the target IP circuit into the at least one power value comprising:

looking up the power factor field of the lookup table according to a power factor of dynamic power management by the power analysis circuit and looking up the mode field of the lookup table according to the operation state of the target IP circuit for acquiring the corresponding value of the dynamic power coefficient field and a corresponding value of the static power coefficient field;

multiplying the power factor by the corresponding value of the dynamic power coefficient field by the power analysis circuit for acquiring the dynamic power value of the target IP circuit;

multiplying the power factor by the corresponding value of the static power coefficient field by the power analysis circuit for acquiring a static power value of the target IP circuit; and taking the static power value and the dynamic power value as the at least one power value by the power analysis circuit.

28. The FPGA-based system power estimation method as claimed in claim 18, further comprising:

acquiring the power model from a control platform through an message input/output transaction circuit.

29. The FPGA-based system power estimation method as claimed in claim 18, further comprising:

transferring the at least one power value to a control platform through an message input/output transaction circuit.

30. The FPGA-based system power estimation method as claimed in claim 18, wherein the step of converting the operation state of the target IP circuit into the at least one power value comprises:

looking up a lookup table of the power model according to the operation state provided by the power state indicator circuit for acquiring the at least one power value corresponding to the operation state.

31. The FPGA-based system power estimation method as claimed in claim 18, wherein the operation state comprises a system clock frequency value of the target IP circuit, and the step of converting the operation state of the target IP circuit into the at least one power value comprises:

looking up a lookup table of the power model according to the system clock frequency value for acquiring a plurality of adjacent frequency values corresponding to the system clock frequency value; and conducting an interpolation calculation or an extrapolation calculation by using the adjacent frequency values for acquiring the at least one power value.

32. The FPGA-based system power estimation method as claimed in claim 18, wherein the operation state provided by the power state indicator circuit comprises a system clock frequency value and a system voltage value of the target IP circuit, the power model comprises a plurality of lookup tables, and the step of converting the operation state of the target IP circuit into the at least one power value comprises:

choosing a candidate lookup table from the lookup tables according to the system voltage value, wherein the candidate lookup table corresponds to a candidate reference voltage value;

looking up the candidate lookup table according to the system clock frequency value for acquiring at least one candidate power value corresponding to the system clock frequency value; and calculating the at least one power value by using the system voltage value, the candidate reference voltage value, and the at least one candidate power value.

* * * * *